US007513491B2

(12) United States Patent
Ogawa et al.

(10) Patent No.: US 7,513,491 B2
(45) Date of Patent: Apr. 7, 2009

(54) ENGINE MOUNT SYSTEM

(75) Inventors: Tsutomu Ogawa, Saitama (JP); Kunihiko Kimura, Saitama (JP); Shuichi Ono, Saitama (JP); Eiji Yamada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 228 days.

(21) Appl. No.: 11/199,788

(22) Filed: Aug. 9, 2005

(65) Prior Publication Data
US 2006/0038331 A1 Feb. 23, 2006

(30) Foreign Application Priority Data

Aug. 9, 2004 (JP) ............................. 2004-232621
Aug. 9, 2004 (JP) ............................. 2004-232623

(51) Int. Cl.
*F16F 15/00* (2006.01)
(52) U.S. Cl. ....................... 267/140.14; 267/140.11; 267/140.13; 267/140.15
(58) Field of Classification Search ............ 267/140.14, 267/140.15, 140.11, 140.13; 248/562, 566, 248/636, 638; 180/300, 312, 702; 123/192.1
See application file for complete search history.

(56) References Cited
U.S. PATENT DOCUMENTS 4,828,234 A * 5/1989 Hoying et al. .......... 267/140.14
4,840,358 A * 6/1989 Hoying et al. .......... 267/140.14
5,205,546 A * 4/1993 Schisler et al. .......... 267/140.13
5,246,212 A * 9/1993 Funahashi et al. ...... 267/140.13
5,386,977 A * 2/1995 Quast .................... 267/140.13
6,082,718 A * 7/2000 Yamada et al. .......... 267/140.14

FOREIGN PATENT DOCUMENTS

| JP | 05-139165 | | 6/1993 |
|---|---|---|---|
| JP | 07-229617 | | 8/1995 |
| JP | 10-246278 | | 9/1998 |
| JP | 2002-19475 A | * | 1/2002 |
| JP | 2002-089616 | | 3/2002 |
| JP | 2003-049892 | | 2/2003 |

* cited by examiner

*Primary Examiner*—Robert A Siconolfi
*Assistant Examiner*—Mariano Sy
(74) *Attorney, Agent, or Firm*—Carrier, Blackman & Associates, P.C.; William D. Blackman; Joseph P. Carrier

(57) ABSTRACT

An engine mount system includes multiple liquid-filled engine mounts switchable to provide different mount characteristics by selectively introducing negative pressure or atmospheric pressure. On one of pipelines connected to the respective engine mounts for introducing the negative or atmospheric pressure into the respective engine mounts, a check valve and an orifice portion are provided in parallel. The orifice portion restricts an amount of air flowing therethrough, so that the mount characteristic of the engine mount connected to the one pipeline equipped with the check valve and the orifice portion does not undergo an abrupt change when the pressure introduced in the engine mount is switched from the negative pressure to the atmospheric pressure.

7 Claims, 12 Drawing Sheets

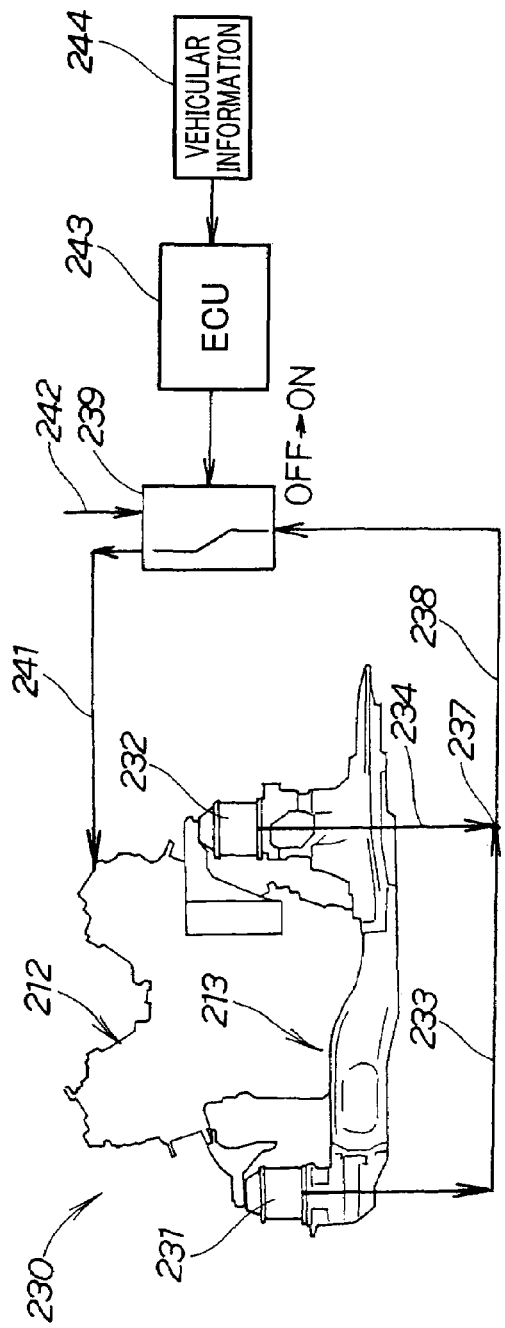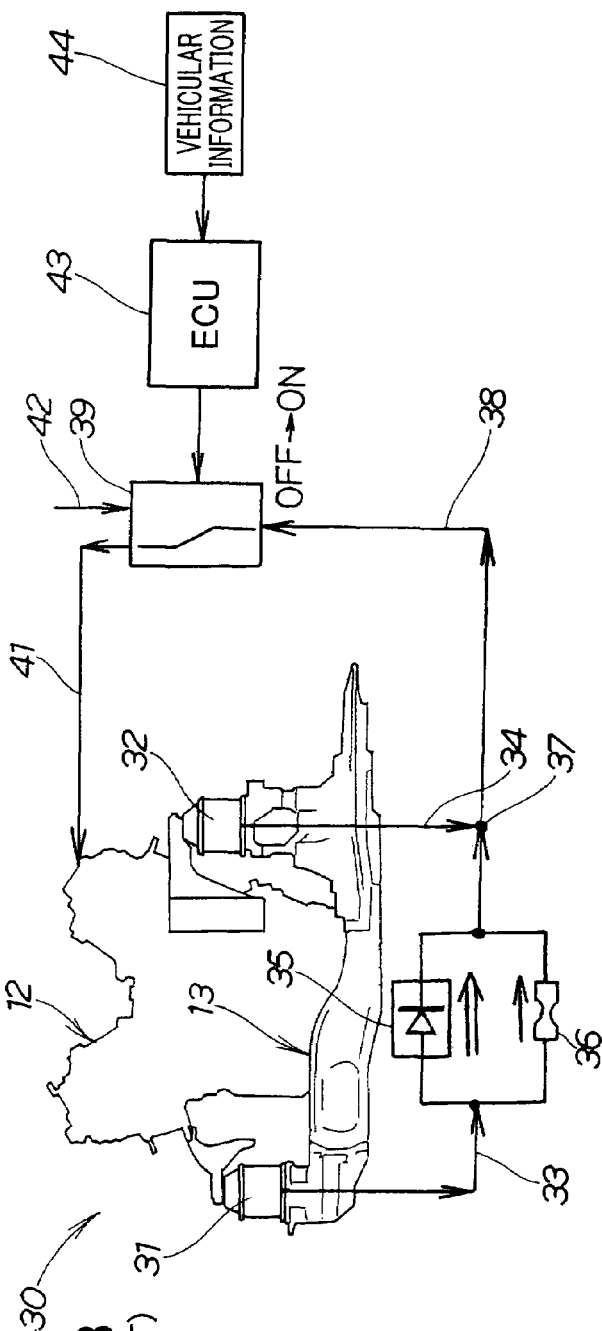
FIG. 5A (COMP. EXA.)
FIG. 5B (EMBODIMENT)

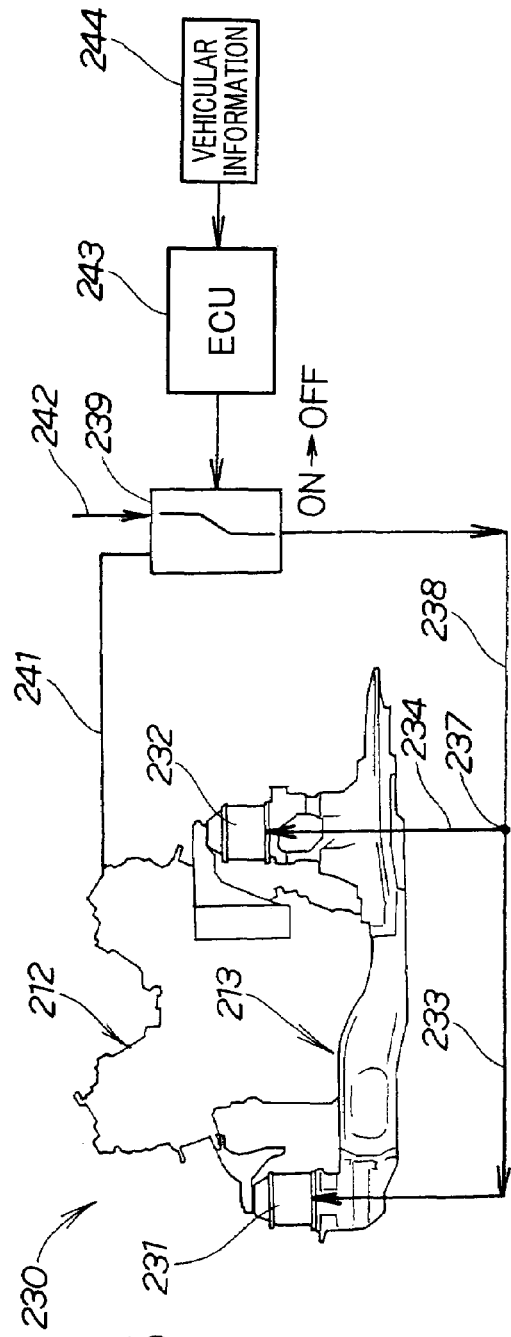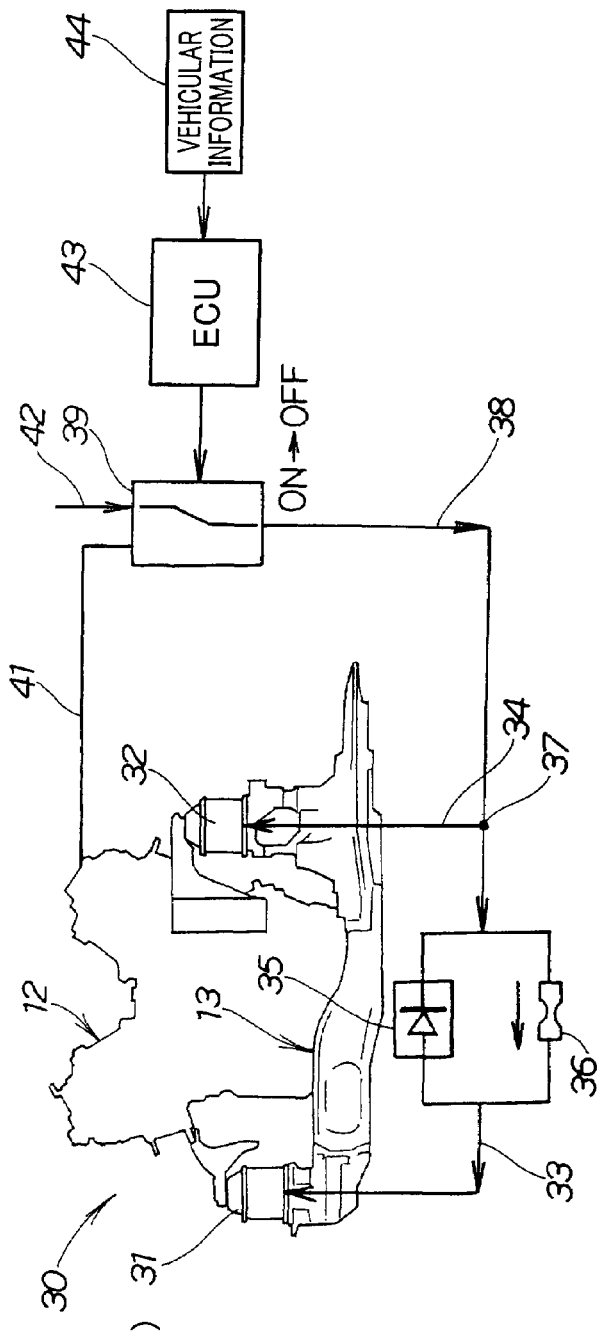
FIG. 6A (COMP. EXA.)
FIG. 6B (EMBODIMENT)

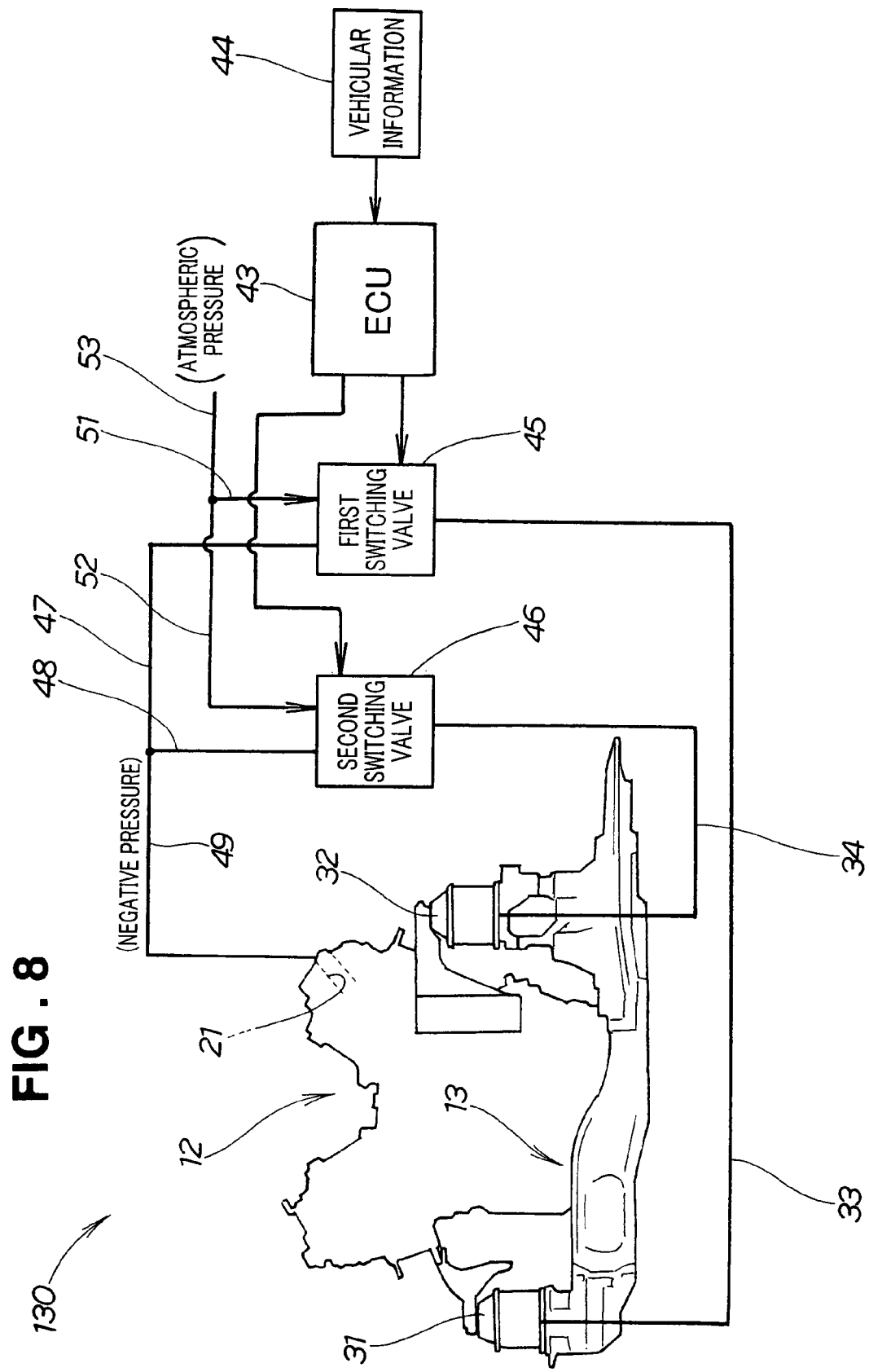

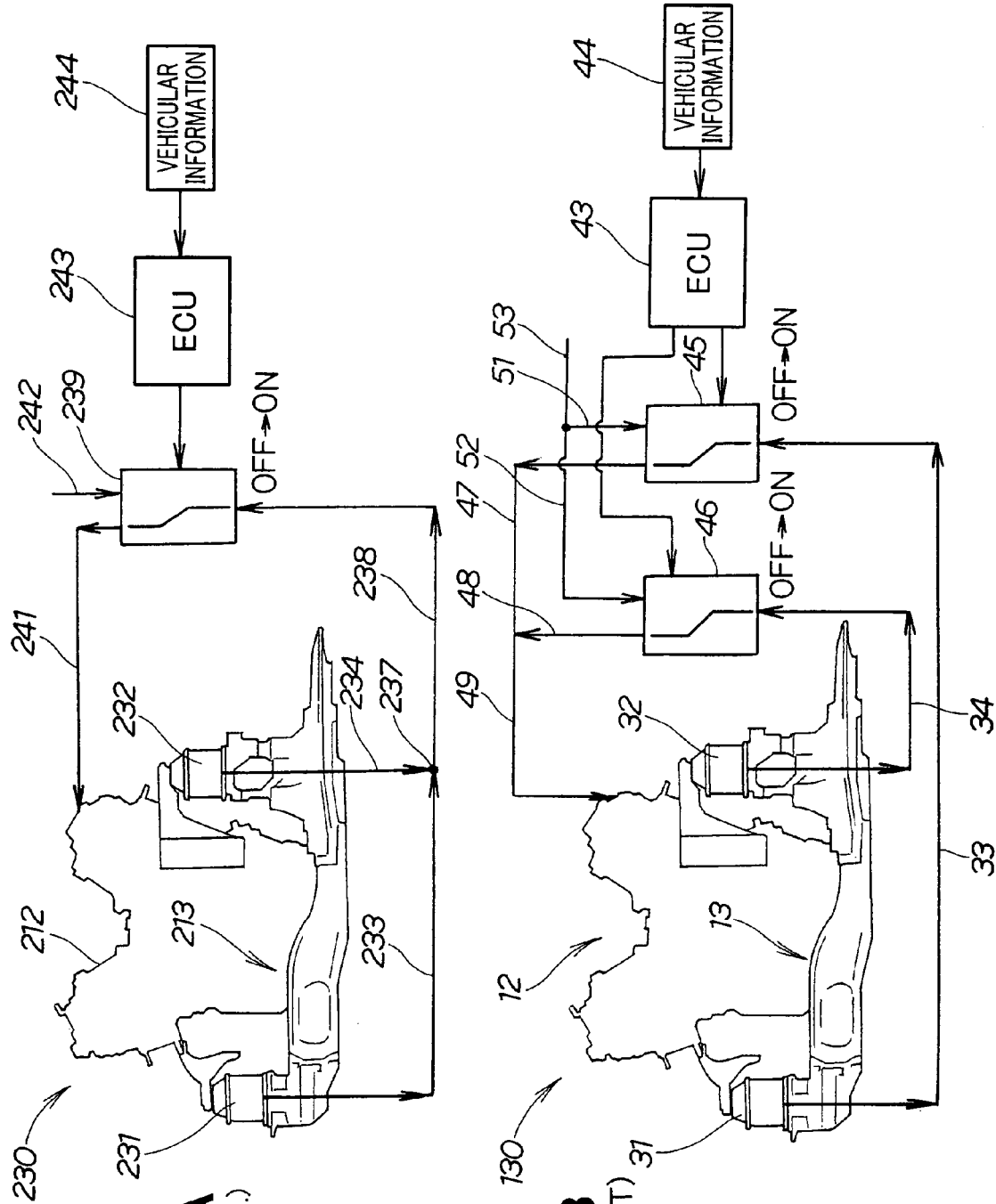

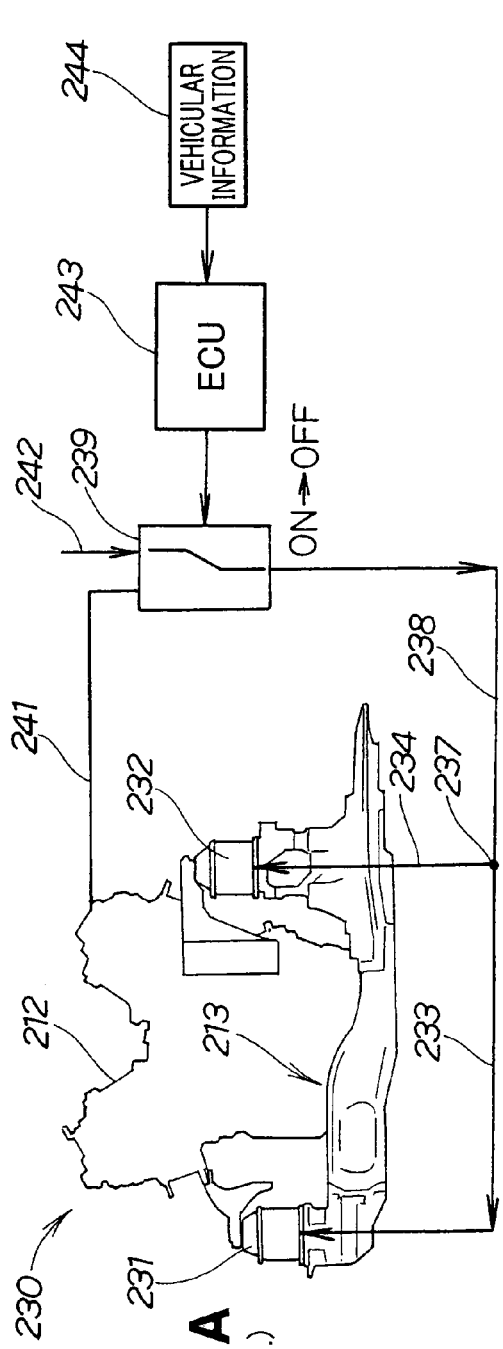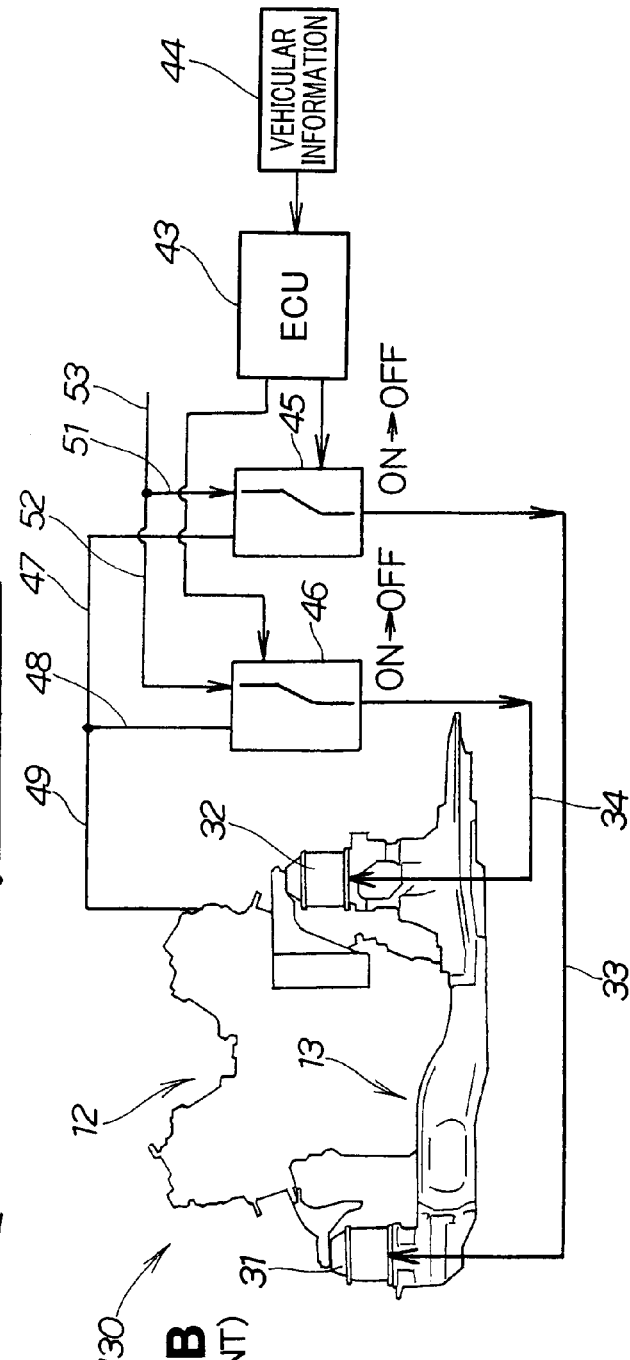
FIG. 10A (COMP. EXA.)
FIG. 10B (EMBODIMENT)

ENGINE MOUNT SYSTEM

CROSS-REFERENCE TO RELATED APPLICATIONS

The present invention claims priority under 35 USC 119 based on Japanese patent application Nos. 2004-232621 and 2004-232623, both filed Aug. 9, 2004. The entire disclosures of these Japanese patent applications are incorporated herein by reference.

FIELD OF THE INVENTION

The present invention relates to an engine mount system using vacuum-driven switchable liquid-filled engine mounts that are switchable to provide different vibration damping characteristics by selectively introducing negative pressure or atmospheric pressure.

BACKGROUND OF THE INVENTION

Engine mount systems using vacuum-driven switchable liquid-filled engine mounts are in practical use. The liquid-filled engine mounts are switchable to provide different vibration damping characteristics by selectively introducing negative pressure from the intake manifold of an engine or atmospheric pressure. By thus switching the pressure introduced therein, the engine mount can appropriately absorb the engine vibrations.

An engine mount system including such switchable liquid-filled engine mounts is disclosed in, for example, JP-A-2003-49892 wherein damping characteristics of the engine mounts are varied when the engine speed changes from an idle speed range to a high speed range or vice versa. Such disclosed engine mount system will be explained with reference to FIG. 12 hereof.

The engine mount system (designated at 300) shown in FIG. 12 includes vacuum-driven switchable liquid-filled engine mounts 302 (only one shown) attached to a vehicle body 303 for supporting an engine 301, and a solenoid valve 304 (an electromagnetically switching valve) connected to pressure introducing pipes of the engine mounts 302. The solenoid valve 304 communicates with the surrounding atmosphere and is connected to an intake manifold 305 of the engine 301 as a negative pressure source.

The solenoid valve 304 switches pressure to be introduced into the liquid-filled engine mounts 302 to vary the degree of firmness with which the engine mounts 302 support the engine 301. The degree of firmness will be referred to as "mount characteristic" or "vibration damping characteristic". For example, when the engine 301 runs in an idle speed range, negative pressure is introduced into the engine mounts 302 to set the mount characteristics soft. When the engine 302 runs in a high speed range, atmospheric pressure is introduced into the engine mounts 302 to set the mount characteristics hard.

Plural (for example, four) vacuum-driven switchable liquid-filled engine mounts are used for the purpose of supporting an engine on a sub-frame (not shown). However, the engine mount system 300 is less suitable for this purpose because all the mount characteristics of the plural engine mounts 302 are changed or switched simultaneously. With this simultaneous switching, the mount characteristics of the engine mount system 300 vary abruptly. Due to this abrupt change, the mount characteristics can not correspond to the speed of the engine 301. As a result, efficient suppression of vibrations from the engine 301 can not be achieved. To address this problem, a technique is needed which prevents an abrupt change in the mount characteristics of the engine mounts when the pressure introduced in the engine mounts is switched, so as to efficiently absorb engine vibrations.

In the engine mount system 300, the one solenoid valve 304 switches the pressure in all the plural engine mounts 302 to the negative or atmospheric pressure. Thus, the vibration damping characteristics of the plural engine mounts 302 can assume only two states, that is, the vibration damping characteristics are all soft or all hard. As a result, inappropriate mount characteristics not corresponding to the speed of the engine would be inevitably used. Therefore, it is desirable to set a mount characteristic suitable for a speed range other than the idle speed range and the high speed range. Namely, an engine mount system is required which is capable of setting a mount characteristic of a vacuum-driven switchable liquid-filled engine mount in correspondence to a vehicular state.

SUMMARY OF THE INVENTION

According to a first aspect of the present invention, there is provided an engine mount system comprising: multiple vacuum-driven switchable liquid-filled engine mounts that are switchable to provide different mount characteristics by selectively introducing negative pressure or atmospheric pressure; pipelines connected to the respective engine mounts for introducing the negative pressure or the atmospheric pressure into the engine mounts; and a check valve and an orifice portion for restricting a flow rate of a fluid flowing therethrough, the check valve and the orifice portion being provided in parallel on one of the pipelines.

In the present invention, the check valve and the orifice portion for restricting the flow rate of the fluid flowing therethrough are provided in parallel on the one of the pipelines. With this arrangement, flows of fluids into the engine mounts are controlled such that switching of the pressure in one engine mount from the negative pressure to the atmospheric pressure or from the atmospheric pressure to the negative pressure occurs at different timing than switching of the pressure in another engine mount. Thus, the engine mount system can provide another mode different from the other two modes in which the negative pressure is introduced in the respective engine mounts and in which the atmospheric pressure is introduced in the respective engine mounts. By thus providing the third damping mode, the engine mount system can efficiently absorb the engine vibrations and improve a sound level of the vehicle.

The engine mount system may further comprise a switching valve for switching the pressure to be introduced in the engine mounts between the negative pressure and the atmospheric pressure in accordance with a vehicular running state. In this instance, the pipelines are joined together at a junction, and the switching valve is provided between the junction and a side from which the negative or atmospheric pressure is introduced into the switching valve.

Thus, only a single switching valve is required to switch the pressure in two of the system engine mounts. This results in a reduced cost of the vehicle.

According to a second aspect of the present invention, there is provided an engine mount system comprising: multiple vacuum-driven switchable liquid-filled engine mounts that are switchable to provide different mount characteristics by selectively introducing negative pressure or atmospheric pressure; pipelines connected to the respective engine mounts for introducing the negative pressure or the atmospheric pressure into the engine mounts; and switching valves provided on the respective pipelines for switching the pressure to be introduced in the engine mounts between the negative pressure and the atmospheric pressure.

In the engine mount system of the present invention, the pressure in the respective switchable liquid-filled engine mounts is switched to the negative or atmospheric pressure by the associated switching valves. Thus, by combining switching patterns of the respective switching valves, it is possible for the engine mounts to provide an increased number of different mount characteristics. The engine mount system can provide a particular type of mount characteristics well matched with a vehicular state having an engine speed other than an idle speed and a high speed. This contributes to further reduction of the vehicle sound level.

According to a third aspect of the present invention, there is provided an engine mount system comprising: multiple vacuum-driven switchable liquid-filled engine mounts that are switchable to provide different mount characteristics by selectively introducing negative pressure or atmospheric pressure; and means for setting mount characteristics of the engine mounts in accordance with a vehicular running state, including a mount characteristic achieved when the negative pressure is introduced to the engine mounts, a mount characteristic achieved when the atmospheric pressure is introduced to the engine mounts, and a mount characteristic intermediate the first and second mount characteristics. The means for setting mount characteristics of the engine mounts may comprise the corresponding components as discussed above in relation to the first and second aspects of the invention.

BRIEF DESCRIPTION OF THE DRAWINGS

Certain embodiments of the present invention will hereinafter be described in detail, by way of example only, with reference to the accompanying drawings, in which:

FIG. 5A is a diagrammatical view showing operation of an engine mount system in a comparative example when an engine runs at an idle speed and FIG. 5B is a diagrammatical view showing operation of the engine mount system according to the first embodiment when the engine runs at the idle speed;

FIG. 6A is a diagrammatical view showing operation of the engine mount system in the comparative example when the engine runs at a running speed at which a vehicle runs and FIG. 6B is a diagrammatical view showing operation of the engine mount system according to the first embodiment when the engine runs at a running speed at which the vehicle runs;

FIG. 8 is a diagrammatical view of the engine mount system according to the second embodiment of the present invention;

FIG. 9A is a diagrammatical view showing the operation of the engine mount system in the comparative example when the engine runs at the idle speed and FIG. 9B is a diagrammatical view showing operation of the engine mount system according to the second embodiment when the engine runs at the idle speed;

FIG. 10A a diagrammatical view showing the operation of the engine mount system in the comparative example when the engine runs at the running speed and FIG. 10B is a diagrammatical view showing operation of the engine mount system according to the second embodiment when the engine runs at a running speed at which the vehicle runs;

DETAILED DESCRIPTION OF THE PREFERRED EMBODIMENTS

Figure 1:
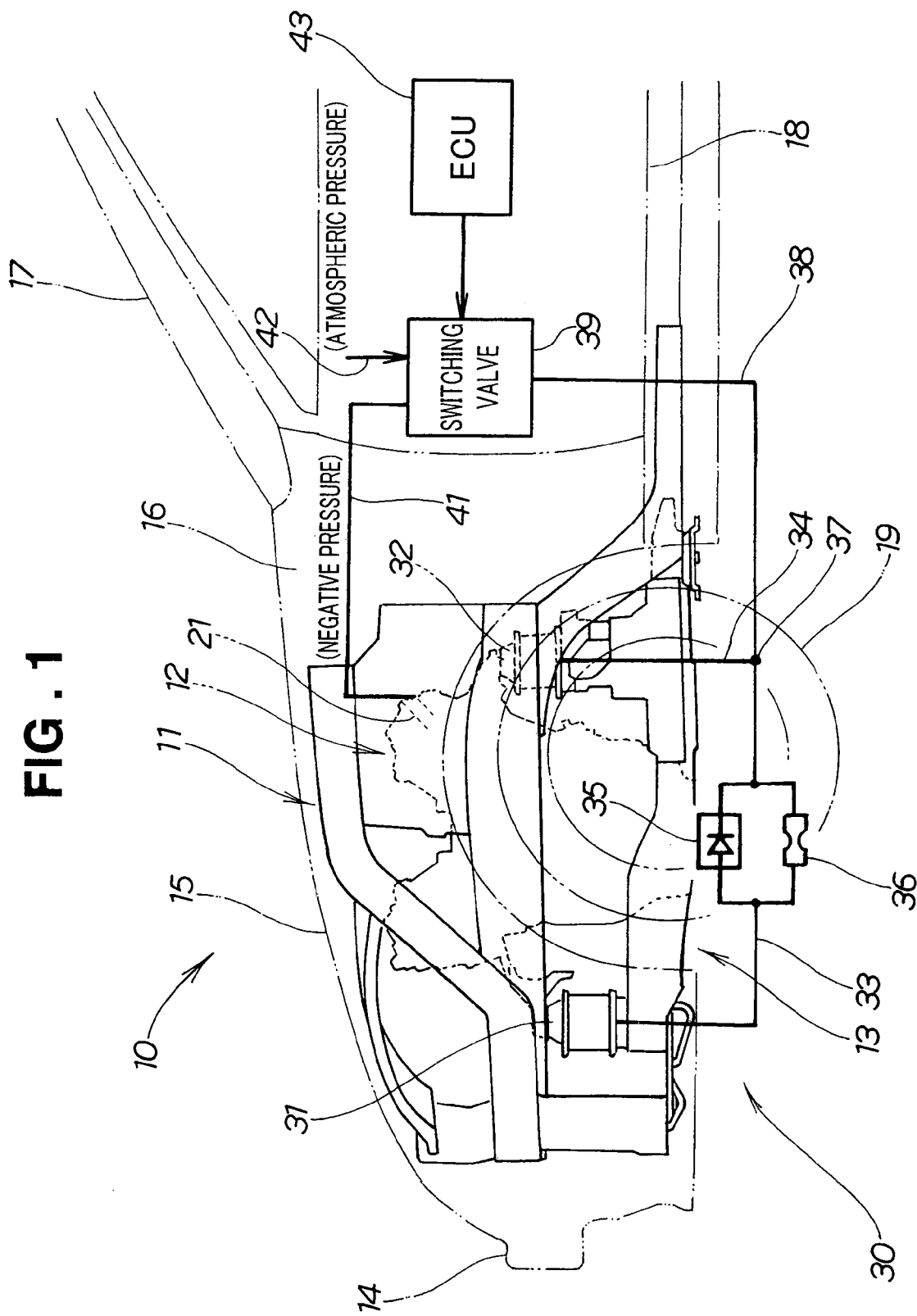
FIG. 1 is a schematic view of a front part of a vehicle employing an engine mount system according to a first embodiment of the present invention.

In FIG. 1, reference numerals 10, 11, 12, 13, 14, 15, 16, 17, 18 and 19 denote a vehicle, a vehicle body frame (a vehicle body), an engine (an internal combustion engine), a front sub-frame, a front bumper, a hood, a front fender, a windshield, a front door, and a front wheel, respectively.

An engine mount system 30 according to a first embodiment of the present invention includes two vacuum-driven switchable liquid-filled mounts 31, 32 that are switchable to provide different vibration damping characteristics by selectively introducing negative pressure or atmospheric pressure, and the engine 12 supported by the engine mounts 31, 32 on the vehicle body frame 11.

The vacuum-driven switchable liquid-filled mount 31 is hereinafter referred to as "first engine mount 31". Similarly, the vacuum-driven switchable liquid-filled mount 32 is hereinafter referred to as "a second engine mount 32".

To the first engine mount 31, there is provided a first pipeline 33 for introducing a negative or atmospheric pressure into the engine mount 31. To the second engine mount 32, there is provided a second pipeline 34 for introducing a negative or atmospheric pressure into the engine mount 32.

One of the first pipeline 33 and the second pipeline 34, namely the first pipeline 33 is provided with a check valve 35 for allowing flow of a fluid, e.g., air, in only one direction and an orifice portion 36 for restricting a flow rate of the fluid flowing therethrough. The check valve 35 and the orifice portion 36 are provided in parallel.

As discussed hereinabove, the degree of firmness with which each of the first engine mount 31 and the second engine mount 32 supports the engine 12 will be hereinafter referred to as "mount characteristic (or vibration damping characteristic)". By the statement "the mount characteristic (or vibration damping characteristic) is hard", it is meant that the engine mount 31 (or 32) supports the engine 12 firmly. By the statement "the mount characteristic (or the damping characteristic) is soft", it is meant that the engine mount 31 (or 32) supports the engine 12 softly.

Figure 2:
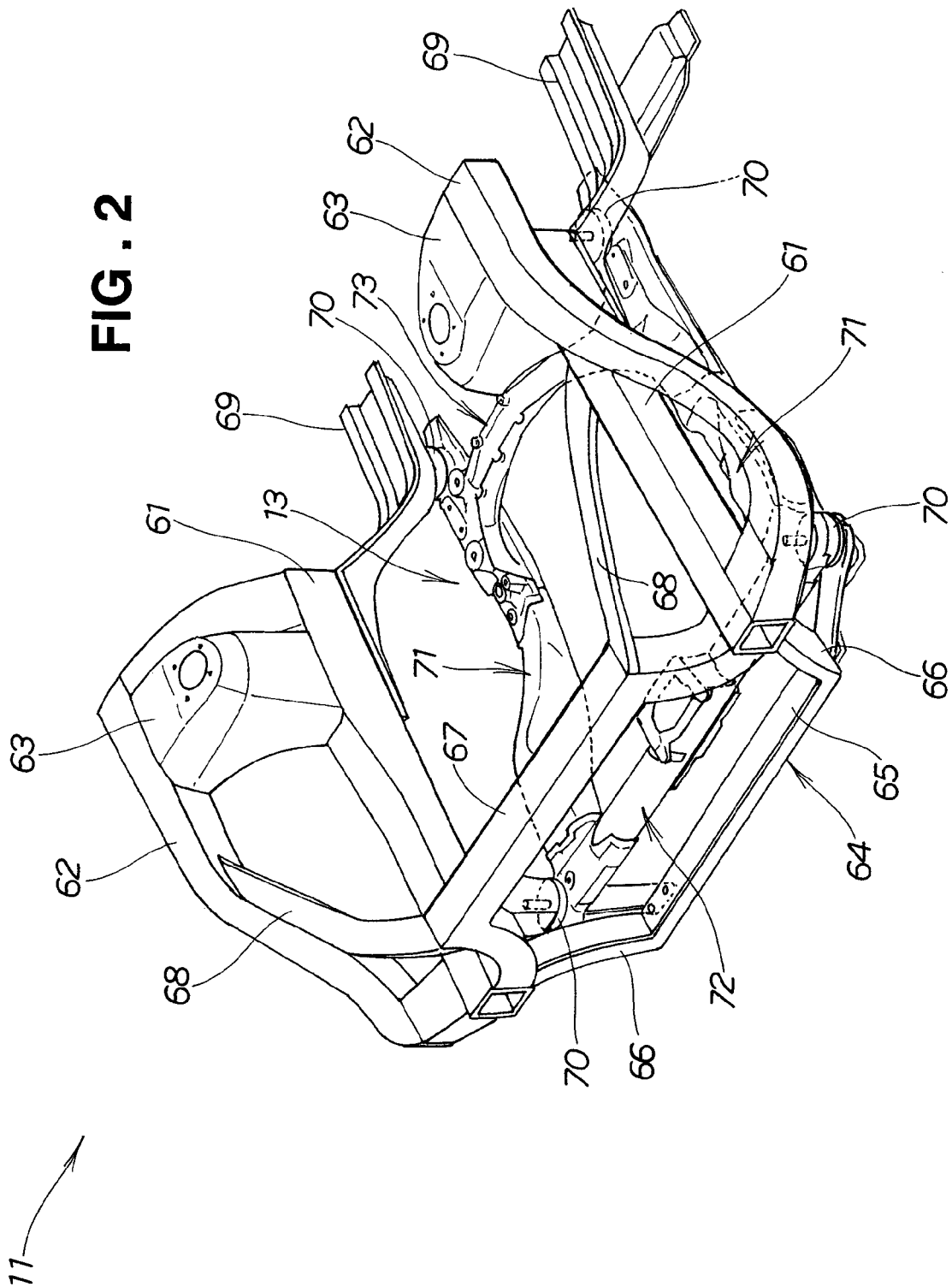
FIG. 2 is a perspective view of a front part structure of a vehicle body frame of the vehicle shown in FIG. 1.

FIG. 2 shows a structure of a front part of the vehicle body frame 11 on which the engine 12 is carried.

The front part structure of the vehicle body frame 11 is formed by a monocoque body including right and left front side frames 61, 61 extending in a front-and-rear direction of the vehicle body 11, right and left upper frames 62, 62 extending in the front-and-rear direction of the vehicle body 11 and disposed transversely outwardly of the right and left front side frames 61, 61, right and left front damper housings 63, 63 interposed between the right front side frame 61 and the right upper frame 62 and between the left front side frame 61 and the left upper frame 62, respectively, and a front bulkhead 64 connected to front portions of the right and left front side frames 61, 61 and to front portions of the right and left upper frames 62, 62.

The front bulkhead 64 includes a lower cross member 65 extending transversely of the vehicle body 11 and disposed below the front portions of the right and left front side frames 61, 61, right and left side stays 66, 66 upwardly extending from opposite ends of the lower cross member 65, and an upper cross member 67 extending transversely of the vehicle body 11 and joined to upper ends of the side stays 66, 66.

The upper cross member 67 has right and left extension portions 68, 68 extending obliquely rearward from right and left end portions of the upper cross member 67, respectively. The right and left extension portions 68, 68 are joined to a portion located between longitudinally opposite ends of the right upper frame 62 and to a portion located between longitudinally opposite ends of the left upper frame 62, respectively.

The front sub-frame 13 is suspended by the front portions of the right and left front side frames 61, 61 and by front end portions of floor frames 69, 69 extending rearward from rear ends of the front side frames 61, 61, through two, or front and rear, pairs of right and left anti-vibration bushes 70.

The front sub-frame 13 is a rectangular frame. The front sub-frame 13 includes a front transverse member 72 extending transversely of the vehicle body 11, right and left longitudinal members 71, 71 extending rearward from right and left end portions of the front transverse member 72, and a rear transverse member 73 connected to rear end portions of the right and left longitudinal members 71, 71.

Figure 3:
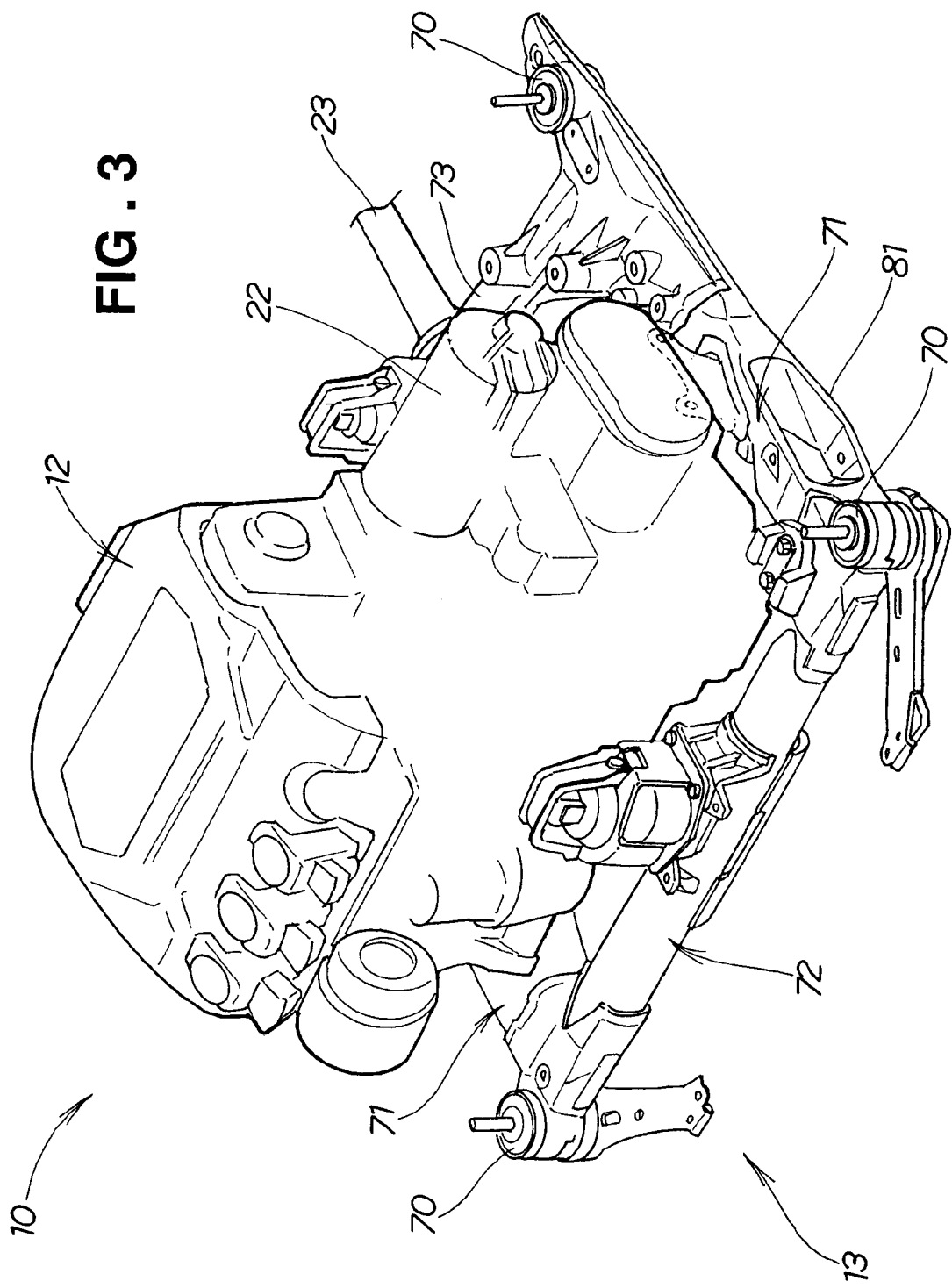
FIG. 3 is a perspective view showing a front sub-frame shown in FIG. 2 and an engine carried on the front sub-frame.

As shown in FIG. 3, the engine (transverse engine) 12 is mounted on an upper right half part of the front sub-frame 13. On an upper left half part of the front sub-frame 13, there is mounted a transmission 22. The transmission 22 is equipped with a propeller shaft 23 extending rearward from an output side of the transmission 22.

Figure 4:
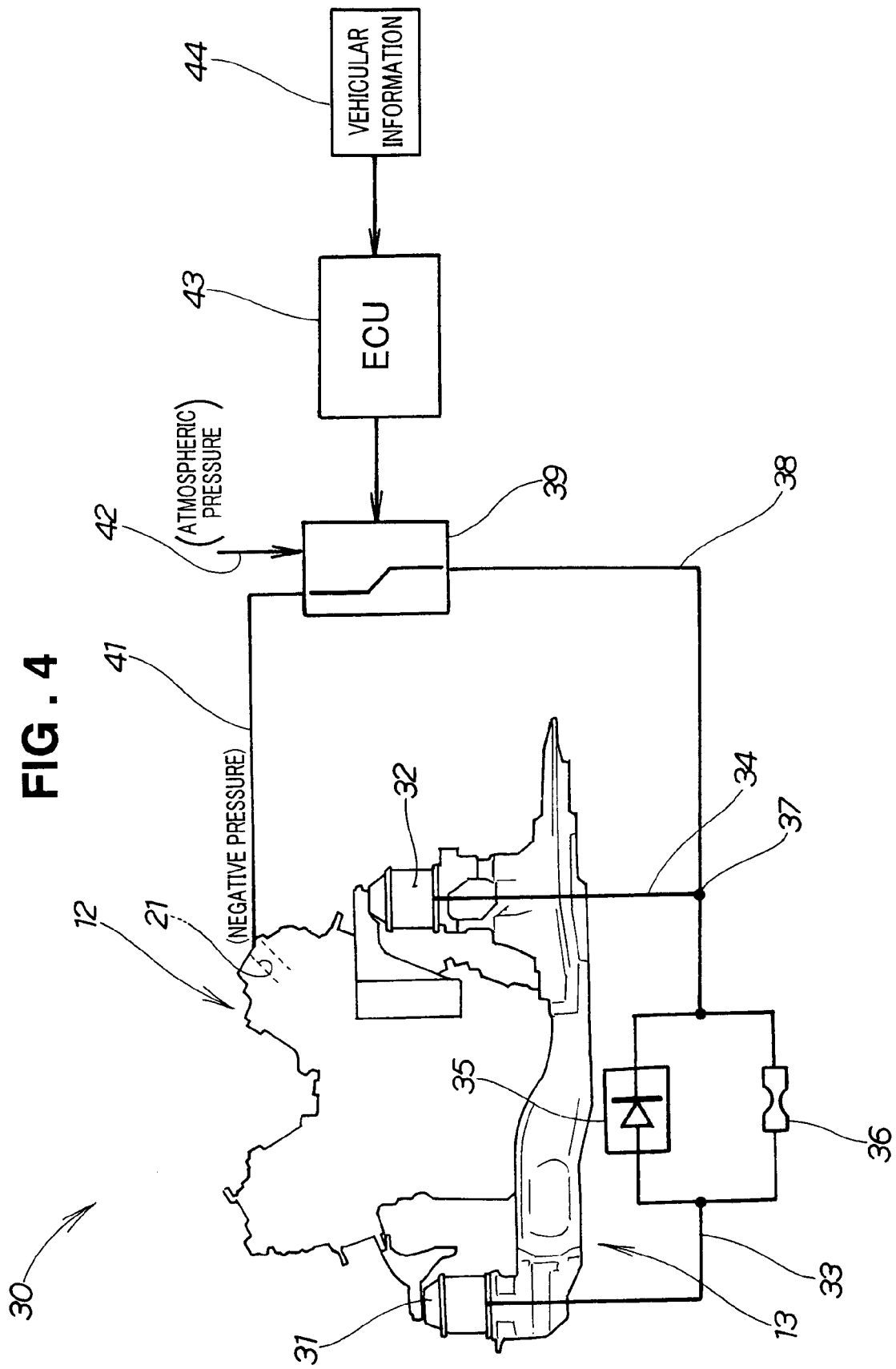
FIG. 4 is a diagrammatical view of the engine mount system according to the first embodiment of the present invention.

FIG. 4 shows an arrangement of the engine mount system 30 according to the first embodiment of the present invention.

The engine mount system 30 includes the first engine mount 31 supporting a front part of the engine 12, the second engine mount 32 supporting a rear part of the engine 12, the first pipeline 33 connected to the first engine mount 31, the check valve 35 and the orifice portion 36 provided in parallel on the first pipeline 33, the second pipeline 34 connected to the second engine mount 32, a joining pipe 38 connected to a junction 37 where the first pipeline 33 and the second pipeline 34 join together, a switching valve (solenoid valve) 39 provided at a distal end of the joining pipe 38, a negative pressure introducing pipe 41 connected at one end to the switching valve 39, a duct 42 opened at one end to atmospheric air and connected at the other end to the switching valve 39, and an electronic controlling unit (hereinafter referred to as "ECU") 43 for controlling operation of the switching valve 39.

By reading in vehicular information about a speed of the engine 12, a degree of opening of a throttle valve (not shown) of the engine 12, a brake signal, a detection of starting of the engine 12 or the like, the ECU 43 brings the switching valve 39 to an ON/OFF state to switch pressure to be introduced in the engine mounts 31, 32 from the negative pressure to the atmospheric pressure or from the atmospheric pressure to the negative pressure so as to control operation mode of the engine mounts 31, 32.

The negative pressure introducing pipe 41 is connected at the other end to the intake manifold 21 of the engine 12 for introducing negative pressure developed in the intake manifold 21 into to the switching valve 39.

The check valve 35 and the orifice portion 36 are provided on the first pipeline 33 in parallel. The check valve 35 allows the fluid (air) to flow there-through in only one direction from the first engine mount 31 to the junction 37. By the arrangement of the check valve and the orifice portion, the fluid in the pipeline 33 must pass through said orifice portion to be communicated with the engine mount 31.

The first and second pipelines 33, 34 are provided for introducing the negative or atmospheric pressure into the first and second engine mounts 31, 32, respectively. The check valve 35 and the orifice portion 36 for restricting the flow rate of the fluid flowing therethrough are provided in parallel on one of the first and second pipelines 33, 34, such that switching of the pressure in one of the engine mounts 31, 32 to the negative or atmospheric pressure occurs at different timing than the switching of the pressure in the other engine mount to the negative or atmospheric pressure. Thus, the engine mount system 30 can provide a third mode in addition to a first mode in which negative pressure is introduced in the engine mounts 31, 32, and a second mode in which atmospheric pressure is introduced in the engine mounts 31, 32. This arrangement of the engine mount system contributes to reduction of engine vibrations to thereby improve the sound level of the vehicle 10 (FIG. 1).

The switching valve 39 for switching pressure to be introduced in the engine mounts 31, 32 to negative or atmospheric pressure in correspondence to a running state of the vehicle 10 is provided between the junction 37 and a side from which the negative or atmospheric pressure is introduced. This means that the switching operation for switching the pressure in the engine mounts 31, 32 can be performed by the single switching valve 39. This results in a reduced cost for the engine mount system 30.

A direction of flow of a fluid through the check valve 35 is directed from the first engine mount 31 to the switching valve 39. Atmospheric pressure in the two engine mounts 31, 32 is switched to negative pressure, simultaneously. However, switching from the negative pressure in one of the two engine mounts 31, 32 to atmospheric pressure occurs at different timing from or later than the switching of the negative pressure in the other engine mount to atmospheric pressure.

Accordingly, if the switching of the negative pressure in the first and second engine mounts 31, 32 to atmospheric pressure is set to occur in synchronism with a shift of the engine speed from an idle speed range to a speed within a high speed range, the engine mounts 31, 32 can smoothly suppress engine vibrations at a start of the vehicle 10. The vehicle 10 (FIG. 1) can start to travel with reduced noise.

Discussion will be made as to operation of the engine mount system 30 with reference to FIG. 5A, FIG. 5B, FIG. 6A and FIG. 6B.

FIG. 5A shows an engine mount system 230 in a comparative example when the engine 212 is running at an idle speed. FIG. 5B shows the engine mount system 30 according to the first embodiment of the present invention when the engine 12 is running at the idle speed.

Referring to FIG. 5A, the engine mount system 230 in the comparative example includes first and second engine mounts 231, 232 supporting the engine 212, a first pipeline 233 extending from the first engine mount 231, a second pipeline 234 extending from the second engine mount 232, a joining pipe 238 connected to a junction 237 where the first and second pipelines 233, 234 join together, a switching valve 239 provided at a distal end of the joining pipe 238, a negative pressure introducing pipe 241 connected at one end to the switching valve 239, a duct 242 open at one end to atmospheric air and connected at the other end to the switching valve 239 in parallel with the negative pressure introducing pipe 241, and an electronic controlling unit (ECU) 243 for controlling operation of the switching valve 239. The engine mounts 231, 232 are vacuum-driven switchable liquid-filled mounts which are identical in structure to the engine mounts 31, 32 of the present invention.

By reading in vehicular information 244 about a speed of the engine 212, a degree of opening of a throttle valve of the engine 212, a brake signal, a detection of starting of the engine 212 and the like, the ECU 243 brings the switching valve 239 to an ON/OFF state to switch pressure in the engine mounts 231, 232 to negative or atmospheric pressure for controlling operation mode of the first and second engine mounts 231, 232.

In the engine mount system 230, the switching valve 239 is switched from the OFF state to the ON state for switching the atmospheric pressure in the first and second engine mounts 231, 232 to the negative pressure so as to change mount characteristics of the engine mounts 231, 232, simultaneously. Thus, the mount characteristics of the engine mounts 231, 232 are set to be soft.

In the engine mount system 30 shown in FIG. 5B, the check valve 35 allows flow of the fluid only in one direction from the first engine mount 31 to the switching valve 39. The switching valve 39 is switched from the OFF state to the ON state to switch atmospheric pressure in the engine mounts 31, 32 to negative pressure, thereby changing the mount characteristics of the first and second engine mounts 31, 32, simultaneously. Thus, the mount characteristics of the engine mounts 31, 32 are set to be soft.

FIG. 6A shows the engine mount system 230 in the comparative example when the speed of the engine 212 is a running speed at which the vehicle runs. FIG. 6B shows the engine mount system 30 according to the first embodiment of the present invention when the speed of the engine 12 is a speed at which the vehicle runs.

In FIG. 6A, the mount characteristics of the first and second engine mounts 231, 232 are set to be hard. To this end, the switching valve 239 of the engine mount system 230 is switched from the ON state to the OFF state to switch negative pressure in the engine mounts 231, 232 to atmospheric pressure whereupon the mount characteristics of the engine mounts 231, 232 immediately changes from the soft state to the hard state. Thus, the mount characteristics of the first and second engine mounts 231, 232 would be changed before the speed of the engine 212 is changed from the idle speed to the running speed. As a result, the mount characteristics of the engine mounts 231, 232 would not correspond to the speed of the engine 212.

In FIG. 6B, the mount characteristics of the engine mounts 31, 32 are set to be hard. Because the check valve 35 and the orifice portion 36 for restricting the flow rate of the fluid flowing therethrough are provided in parallel on the first pipeline 33, switching of a negative pressure in the first engine mount 31 to an atmospheric pressure occurs at different timing from the switching of a negative pressure in the second engine mount 32 to an atmospheric pressure. Thus the engine mount system 30 can provide a third mode other than a first mode in which the negative pressure is introduced in the first and second engine mounts 31, 32, and a second mode in which the atmospheric pressure is introduced in the engine mounts 31, 32.

In the engine mount system 30, the check valve 35 allows flow of the fluid in only one direction from the first engine mount 31 to the switching valve 39, and the orifice portion 36 is provided to restrict a flow rate of the fluid flowing along the first pipeline 33. Accordingly, when the switching valve 39 is switched from the ON state to the OFF state to switch the negative pressure in the first and second engine mounts 31, 32 to the atmospheric pressure, the check valve 35 blocks atmospheric air from flowing toward the first engine mount 31, and the orifice portion 36 allows atmospheric air to flow in a restricted amount through the orifice portion 36 to the first engine mount 31. This will prevent the mount characteristic of the first engine mount 31 from undergoing an abrupt change. This is particularly advantageous when the engine speed changes from the idle speed to the running speed so that the mount characteristic can correspond to the speed of the engine 12. By thus providing the mount characteristic well matched with the engine speed, it is possible to considerably absorb the engine vibrations and improve the sound level of the vehicle.

In the engine mount system 30 according to the first embodiment, the check valve 35 allows flow of the fluid in only one direction from the first engine mount 31 to the switching valve 39, as shown in FIG. 4. However, the check valve 35 may be arranged to allow flow of the fluid in an opposite direction from the switching valve 39 to the first engine mount 31.

In the engine mount system 30 according to the first embodiment, the atmospheric pressure in the engine mounts 31, 32 is switched to the negative pressure when the switching valve 39 is switched from the OFF state to the ON state, while the negative pressure in the engine mounts 31, 32 is switched to the atmospheric pressure when the switching valve 39 is switched from the ON state to the OFF state, as explained in conjunction with FIG. 5A through FIG. 6B. However, the switching valve 39 may be arranged to switch the atmospheric pressure in the engine mounts 31, 32 to the negative pressure when the switching valve 39 is switched from the ON state to the OFF state and to switch the negative pressure in the engine mounts 31, 32 to the atmospheric pressure when the switching valve 39 is switched from the OFF state to the ON state.

An engine mount system 130 according to a second embodiment of the present invention will be explained with reference to FIG. 7 and FIG. 8. It is to be noted that the same members of the engine mount system 130 as those used in the engine mount system 30 according to the first embodiment as shown in FIG. 1 to FIG. 4 are denoted by the same reference numerals, and their explanations will be omitted. It is also noted that a front part structure of a vehicle body frame carrying thereon the engine 12 supported by the engine mounts 31, 32 of the engine mount system 130 is the same as that shown in FIG. 2 and FIG. 3.

Figure 7:
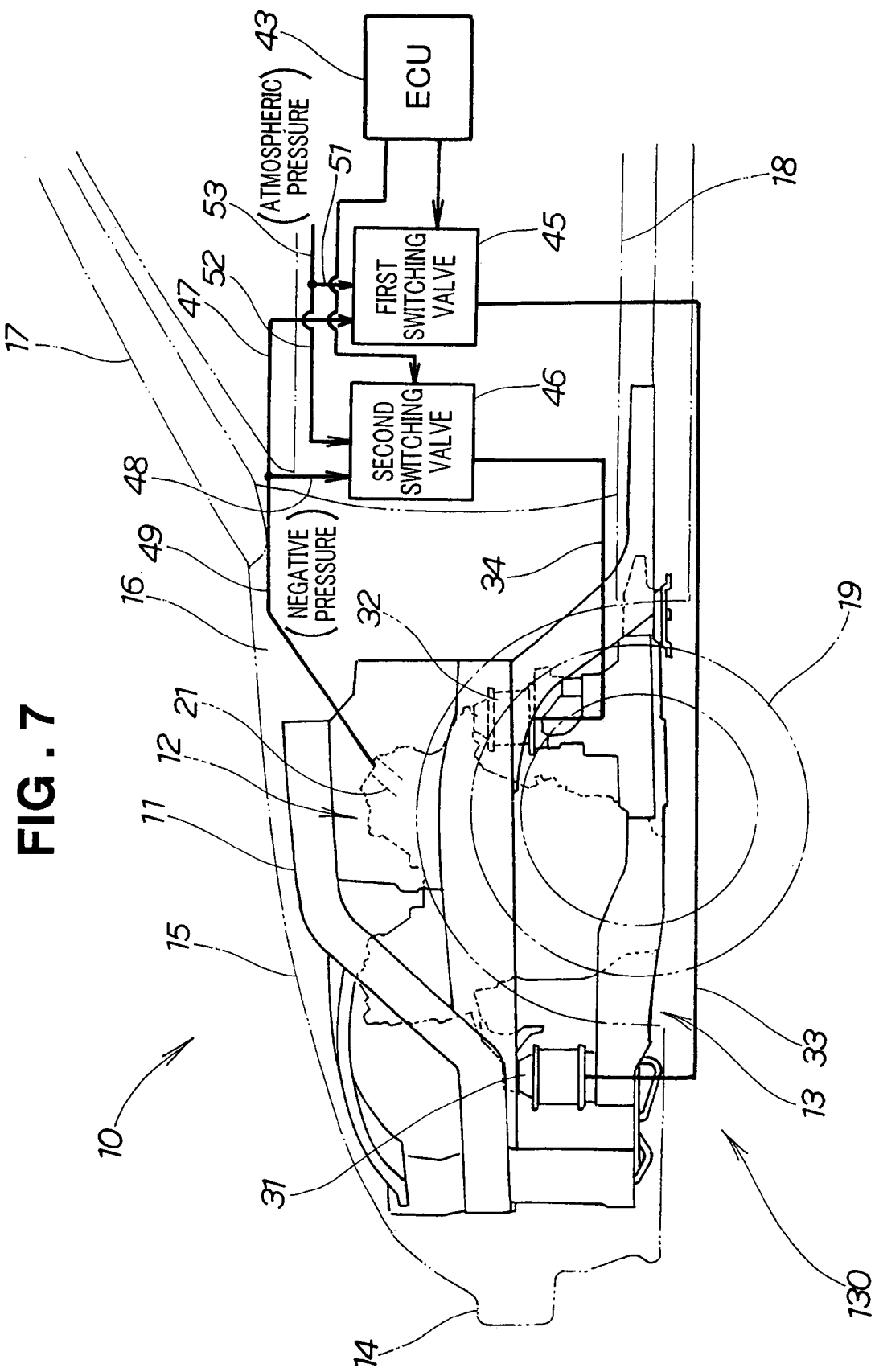
FIG. 7 is a schematic view of a front part of a vehicle employing an engine mount system according to a second embodiment of the present invention.

As shown in FIG. 7, the engine mount system 130 according to the second embodiment of the present invention includes first and second switching valves 45, 46 provided on the first and second pipelines 33, 34, respectively, for switching pressure in the first and second engine mounts 31, 32 to negative or atmospheric pressure.

FIG. 8 shows an arrangement of the engine mount system 130 according to the second embodiment of the present invention.

The engine mount system 130 includes the first engine mount 31 supporting the front part of the engine 12, the second engine mount 32 supporting the rear part of the engine 12, the first pipeline 33 connected to the first engine mount 31, the first switching valve (first solenoid valve) 45 connected to the first pipeline 33, the second pipeline 34 connected to the second engine mount 32, the second switching valve (second solenoid valve) 46 connected to the second pipeline 34, a first negative pressure introducing pipe 47 connected to the first switching valve 45, a first duct 51 open at one end to atmospheric air and connected at the other end to the first switching valve 45, a second negative pressure introducing pipe 48 connected to the second switching valve 46, a second duct 52 open to atmospheric air and connected to the second switching valve 46, a negative pressure joining pipe 49 connected to a junction where the first negative pressure introducing pipe 47 and the second negative pressure introducing pipe 48 join together, a joining duct 53 connected to a junction where the first duct 51 and the second duct 52 join together, and the ECU 43 for controlling operations of the first and second switching valves 45, 46.

The negative pressure joining pipe 49 is connected to the intake manifold 21 of the engine 12 and acts as a passage for introducing a negative pressure from the intake manifold 21 into the pipes 47, 48.

The switching valves 45, 46 perform the switching operations separately to increase the number of types of the mount characteristics of the first and second engine mounts 31, 32. As a result, there can be provided a suitable type of the mount characteristics of the engine mounts 31, 32 for a vehicular state other than two vehicular states where the engine runs in the idle speed range and where the engine runs in the high speed range. Such a suitable type of the mount characteristics of the engine mounts 31, 32 contributes to reduction in sound level of the vehicle 10 (FIG. 7).

Operations of the engine mount system 130 in the second embodiment of the invention and the engine mount system 230 in the comparative example will be described for comparative purposes.

FIG. 9A shows the engine mount system 230 when the engine 212 is running at an idle speed. FIG. 9B shows the engine mount system 130 when the engine 12 is running at the idle speed.

The engine mount system 230 shown in FIG. 9A includes the engine mounts 231, 232 supporting the engine 212, the first pipeline 233 connected to the first engine mount 231, the second pipeline 234 connected to the second engine mount 232, the joining pipe 238 connected to the junction 237 where the first and second pipelines 233, 234 join together, the switching valve 239 connected to the joining pipe 238, the negative pressure introducing pipe 241 connected to the switching valve 239, the duct 242 connected to the switching valve 239 and opened to the surrounding atmosphere, and the ECU 243 for controlling the switching valve 239.

By reading in vehicular information regarding a speed of the engine 212, the degree of opening of the throttle valve of the engine 212, the brake signal, the detection of starting of the engine 212 and the like, the ECU 243 brings the switching valve 239 to the ON/OFF state to switch the pressure in the engine mounts 231, 232 to negative/atmospheric pressure for controlling the first and second engine mounts 231, 232.

In the engine mount system 230, the switching valve 239 is switched from the OFF state to the ON state for switching the atmospheric pressure in the first and second engine mounts 231, 232 to the negative pressure so as to change mount characteristics of the engine mounts 231, 232, simultaneously. Thus, the mount characteristics of the engine mounts 231, 232 are set to be soft.

The engine mount system 130 shown in FIG. 9B switches the first and second switching valves 45, 46 from the OFF states to the ON states to switch the atmospheric pressure in the first and second engine mounts 31, 32 to the negative pressure so as to change the mount characteristics of the engine mounts 31, 32, simultaneously, as in the case of the mount characteristics of the engine mounts 231, 232. Thus, the mount characteristics of the engine mounts 31, 32 are set to be soft.

FIG. 10A shows the engine mount system 230 when the engine 212 running at a running speed at which the vehicle runs. FIG. 10B shows the engine mount system 130 when the engine 12 is running at the speed at which the vehicle runs.

In FIG. 10A, the mount characteristics of the first and second engine mounts 231, 232 are set to be hard. To this end, the switching valve 239 is switched from the ON state to the OFF state to switch the negative pressure in the engine mounts 231, 232 to the atmospheric pressure. In this instance, the mount characteristics of the engine mounts 231, 232 undergo abrupt changes.

In the engine mount system 130 shown in FIG. 10B, the first and second switching valves 45, 46 are switched from the ON states to the OFF states to switch the negative pressure in the engine mounts 31, 32 to the atmospheric pressure for setting the mount characteristics of the engine mounts 31, 32 hard.

When the first and second switching valves 45, 46 are simultaneously switched from the ON states to the OFF states, the mount characteristics of the engine mounts 31, 32 undergo abrupt changes, as in the case of the mount characteristics of the engine mounts 231, 232 shown in FIG. 10A.

The engine mount system 130 according to the second embodiment of the present invention includes the two switching valves 45, 46. By appropriately combing switching patterns of the two switching valves, it is possible to provide two additional modes (hereinafter referred to as "first and second intermediate modes"), as will be described with reference to FIG. 11A and FIG. 11B. In other words, separate switching operations of the switching valves 45, 46 can increase the number of types of mount characteristics of the engine mounts 31, 32.

Figure 11A:
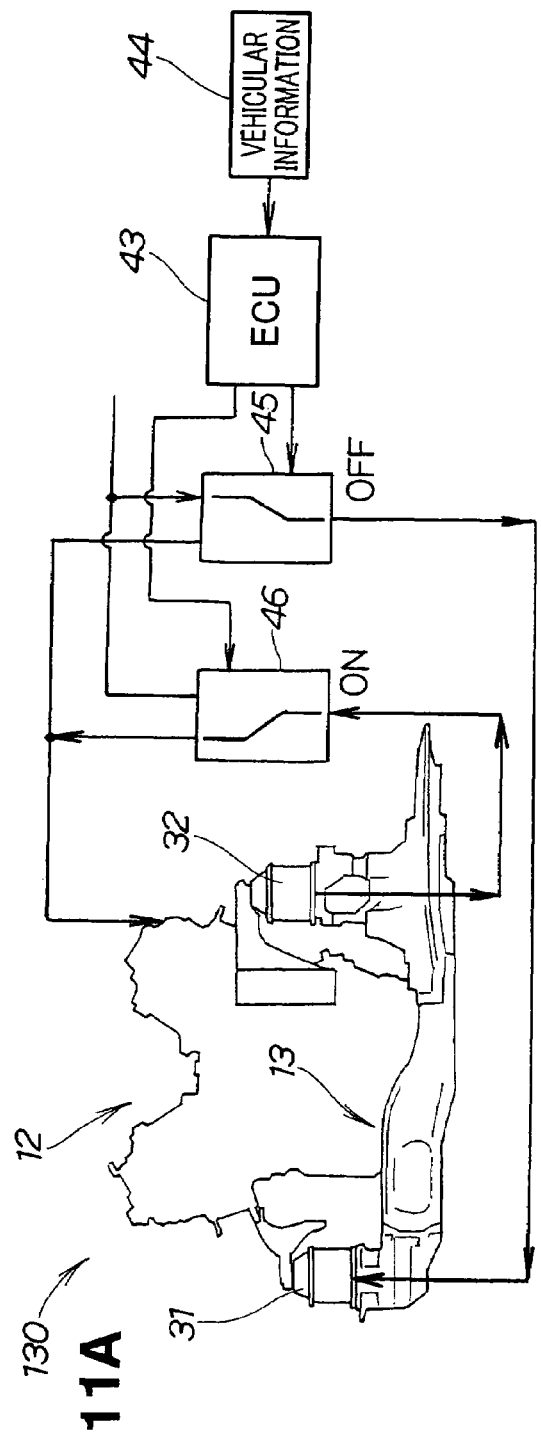
FIG. 11A is a diagrammatical view showing a first intermediate mode provided by the engine mount system according to the second embodiment and FIG. 11B is a diagrammatical view showing a second intermediate mode provided by the engine mount system according to the second embodiment.
Figure 11B:
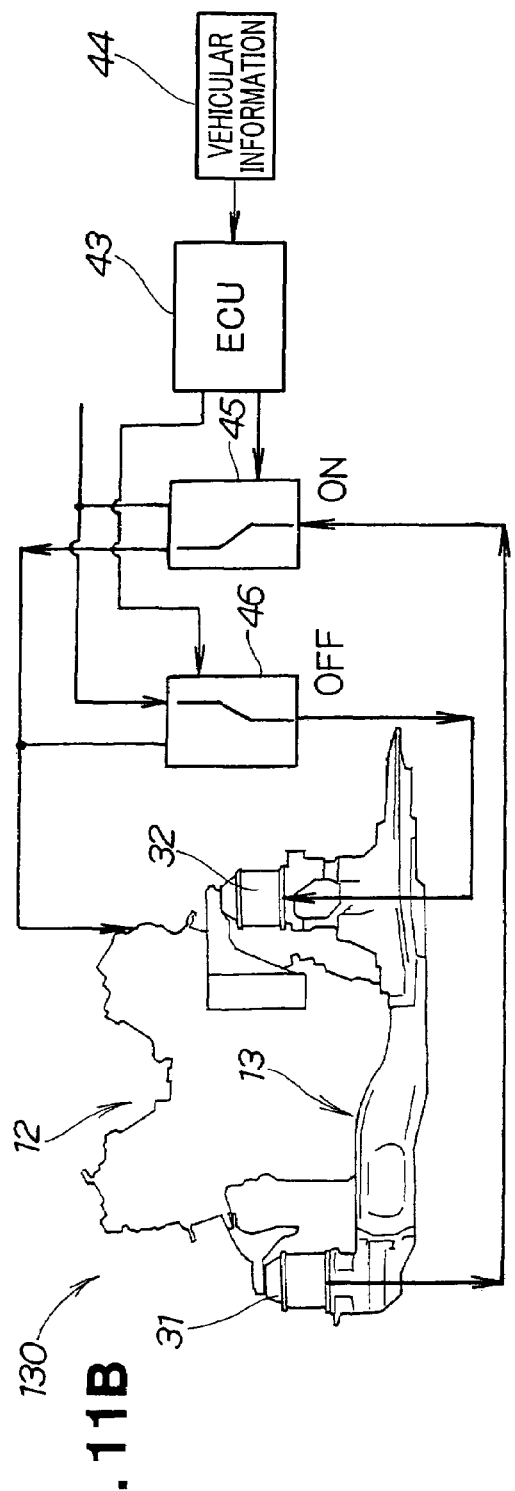
Figure 12:
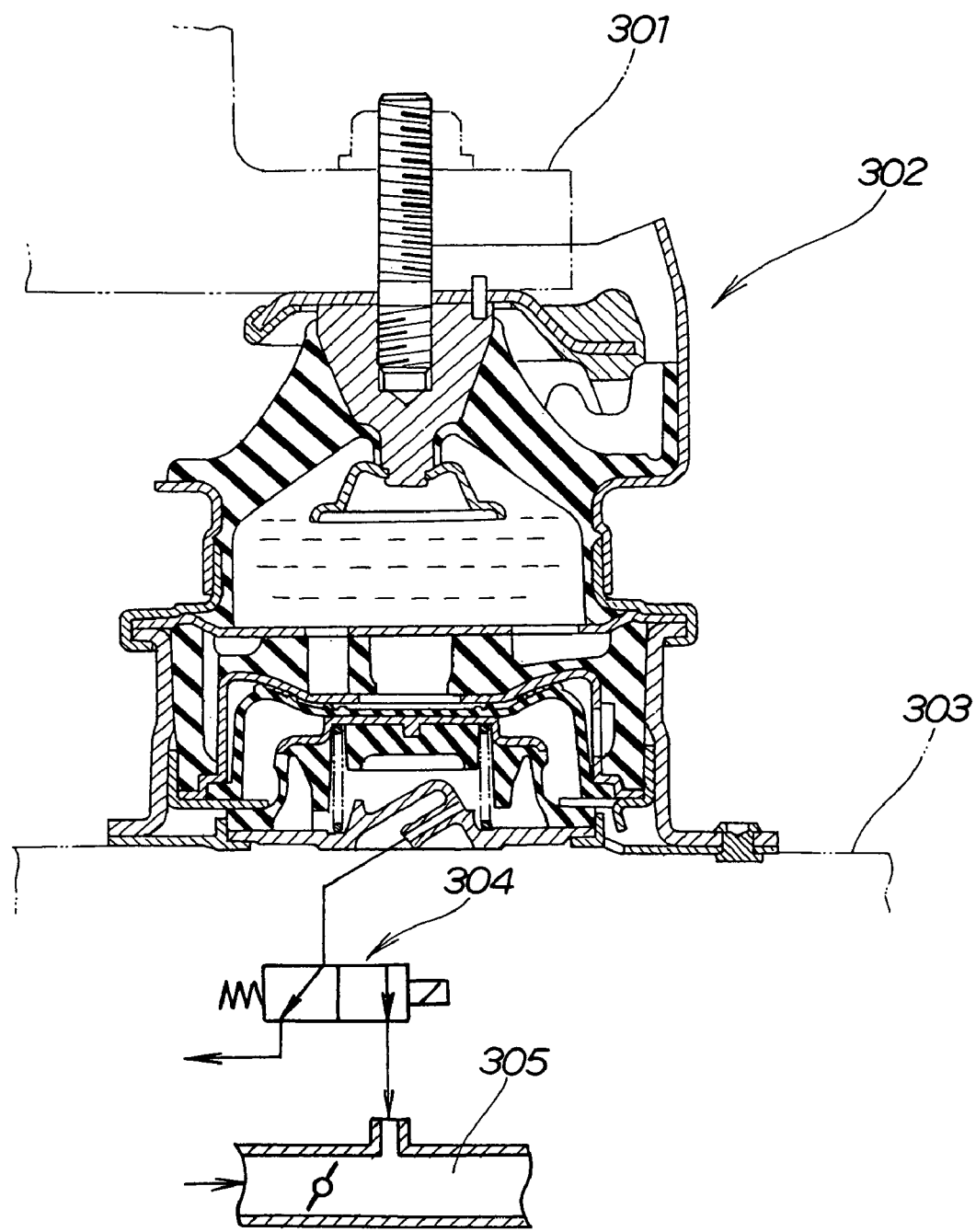
FIG. 12 is a schematic view of a conventional engine mount system using vacuum-driven switchable liquid-filled engine mounts.

FIG. 11A shows the first intermediate mode of the mount characteristics in the engine mount system 130 according to the second embodiment. FIG. 11B shows the second intermediate mode of the mount characteristics in the engine mount system 130.

In the first intermediate mode shown in FIG. 11A, the first switching valve 45 is switched to the OFF state to introduce the atmospheric pressure in the first engine mount 31 while the second switching valve 46 is switched to the ON state to introduce the negative pressure in the second engine mount 32. Thus, the mount characteristic of the first engine mount 31 supporting the front part of the engine 12 is set to be hard while the characteristic of the second engine mount 32 supporting the rear part of the engine 12 is set to be soft. The first intermediate mode is advantageous when used in a case where the load of the engine 12 is concentrated on the front part of the engine 12, for example, when the vehicle decelerates. In this case, by virtue of the first intermediate mode, an engine vibration can be prevented from becoming greater during the deceleration of the vehicle.

In the second intermediate mode shown in FIG. 11B, the first switching valve 45 is switched to the ON state to introduce the negative pressure in the first engine mount 31 while the second switching valve 46 is switched to the OFF state to introduce the atmospheric pressure in the second engine mount 32. Thus, the mount characteristic of the first engine mount 31 supporting the front part of the engine 12 is set to be soft while the mount characteristic of the second engine mount 32 supporting the rear part of the engine 12 is set to be hard. The second intermediate mode is advantageous when used in a case where the load of the engine 12 is concentrated on the rear part of the engine 12, for example, when the vehicle accelerates or starts to travel. In this case, by virtue of the second intermediate mode, the engine vibration can be prevented from becoming greater when the vehicle accelerates or starts to travel.

Although, as shown in FIG. 4 and FIG. 8, each of the engine mount systems 30, 130 includes two vacuum-driven switchable liquid-filled engine mounts 31, 32, three or more engine mounts may be used in each of the engine mount systems 30, 130.

In the engine mount system 130 according to the second embodiment of the present invention, the pressure in the engine mounts 31, 32 is switched from the atmospheric pressure to the negative pressure when the first and second switching valves 45, 46 are switched from the OFF states to the ON state. However, the switching valves 45, 46 may be arranged to switch the atmospheric pressure in the engine mounts 31, 32 to the negative pressure when turned off and to switch the negative pressure in the engine mounts 31, 32 to the atmospheric pressure when turned on.

As discussed above, the engine mount system of the present invention includes the engine mounts capable of effectively absorbing engine vibrations and hence is suitable for vehicles such as a wagon or an automobile carrying an engine having a large displacement.

Obviously, various minor changes and modifications of the disclosed embodiments of the present invention are possible in the light of the above teaching. It is therefore to be understood that within the scope of the appended claims the invention may be practiced otherwise than as specifically described.

What is claimed is:

1. An engine mount system comprising:
   multiple vacuum-driven switchable liquid-filled engine mounts that are switchable to provide different mount characteristics by selectively introducing negative pressure or atmospheric pressure;
   pipelines connected to respective ones of the engine mounts for introducing the negative pressure or the atmospheric pressure into the engine mounts; and
   a check valve and an orifice portion for restricting a flow rate of a fluid flowing therethrough, the check valve and the orifice portion being provided in parallel on one of the pipelines connected to a first engine mount of said engine mounts;
   a switching valve for switching the pressure to be introduced in the engine mounts between the negative pressure and the atmospheric pressure in accordance with a vehicular running state, wherein the pipelines are joined together at a junction, the switching valve is provided between the junction and a side from which the negative or atmospheric pressure is introduced into the switching valve, and the check valve and the orifice portion being provided on the one of the pipelines at a location between the junction and the first engine mount;
   wherein, due to the check valve and the orifice portion being arranged in parallel on said one of the pipelines, the system is operable such that when the switching valve changes the pressure in said pipelines from atmospheric pressure to negative pressure, the pressure in all of said engine mounts changes at a substantially similar rate due to fluid flow through both the check valve and the orifice portion, and when the switching valve changes the pressure in said pipelines from negative pressure to atmospheric pressure, the pressure in said first engine mount changes at a different rate than the pressure in another of said engine mounts, due to fluid flow to the first engine mount exclusively through said orifice portion.

2. An engine mount system according to claim 1, wherein the check valve is configured to allow flow of the fluid in only one direction from the first engine mount through the junction to the switching valve.

3. An engine mount system according to claim 1, wherein the check valve and the orifice portion are arranged so as to prevent mount characteristics of the first engine mount from undergoing an abrupt change.

4. An engine mount system according to claim 1, wherein the check valve and the orifice portion are provided in parallel on said one pipeline such that fluid flowing through said one pipeline in a direction toward said first engine mount must pass through said orifice portion to be communicated with the first engine connected to said one pipeline.

5. An engine mount system comprising:
   multiple vacuum-driven switchable liquid-filled engine mounts that are switchable to provide different mount characteristics by selectively introducing negative pressure or atmospheric pressure, said engine mounts including a first engine mount and a second engine mount; and
   hardware for setting mount characteristics of the engine mounts in accordance with a vehicular running state, including a first mount characteristic achieved when the negative pressure is introduced to the engine mounts, a second mount characteristic achieved when the atmospheric pressure is introduced to the engine mounts, and a third mount characteristic intermediate the first and second mount characteristics, wherein the system is configured and arranged so that when the pressure in said engine mounts is switched from atmospheric pressure to negative pressure, the pressure in said first and second engine mounts changes at a substantially similar rate, and when the pressure in said engine mounts is switched from negative pressure to atmospheric pressure, the pressure in said first engine mount changes at a different rate than the pressure in the second engine mount.

6. An engine mount system according to claim 5, wherein said hardware for setting mount characteristics of the engine mounts includes:
   pipelines connected to respective ones of the engine mounts for introducing the negative pressure or the atmospheric pressure into the engine mounts; and
   a check valve and an orifice portion for restricting a flow rate of a fluid flowing therethrough, the check valve and the orifice portion being provided in parallel on one of the pipelines.

7. An engine mount system according to claim 6, wherein said hardware for setting mount characteristics of the engine mounts further includes:
   a switching valve for switching the pressure to be introduced in the engine mounts between the negative pressure and the atmospheric pressure in accordance with a vehicular running state, wherein the pipelines are joined together at a junction, and the switching valve is provided between the junction and a side from which the negative or atmospheric pressure is introduced into the switching valve.

* * * * *